US007035434B2

(12) United States Patent
Estevez

(10) Patent No.: US 7,035,434 B2
(45) Date of Patent: Apr. 25, 2006

(54) HOUGH TRANSFORM BASED MOTION DETECTION IMAGE RECORDING SYSTEM AND METHOD

(75) Inventor: Leonardo W. Estevez, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 362 days.

(21) Appl. No.: 09/998,132

(22) Filed: Dec. 3, 2001

(65) Prior Publication Data
US 2002/0071596 A1    Jun. 13, 2002

Related U.S. Application Data

(60) Provisional application No. 60/254,813, filed on Dec. 11, 2000.

(51) Int. Cl.
G06K 9/00    (2006.01)
(52) U.S. Cl. .................. 382/107; 382/168; 348/155
(58) Field of Classification Search ............... 382/103, 382/107, 146, 166, 169, 171, 173, 287, 168, 382/281; 342/20, 28, 90, 94; 348/94, 152, 348/154, 139, 155, 672; 375/240.18, 258, 375/317; 358/522; 708/5, 400, 820; 352/39
See application file for complete search history.

(56) References Cited

U.S. PATENT DOCUMENTS 5,629,989 A    5/1997  Osada
5,761,326 A *  6/1998  Brady et al. ................ 382/103
5,790,403 A    8/1998  Nakayama
5,922,036 A    7/1999  Yasui et al.
6,263,089 B1 * 7/2001  Otsuka et al. .............. 382/107
6,297,853 B1 * 10/2001 Sharir et al. ................ 348/589
6,298,143 B1 * 10/2001 Kikuchi et al. ............. 382/103
6,393,163 B1 * 5/2002  Burt et al. ................... 382/294
6,678,394 B1 * 1/2004  Nichani ...................... 382/103
6,757,008 B1 * 6/2004  Smith .......................... 348/143

* cited by examiner

Primary Examiner—Jingge Wu
Assistant Examiner—Abolfazl Tabatabai
(74) Attorney, Agent, or Firm—Robert D. Marshall, Jr.; W. James Brady, III; Frederick J. Telecky, Jr.

(57) ABSTRACT

A Hough based motion detection image recording system includes an image sensor operable to view a surveillance site and output real-time image data corresponding to the site. The system also includes a processor operable to receive the image data from the image sensor and a memory coupled to the processor. The system includes a transformation application residing in the memory and executable by the processor. The transformation application is operable to detect a real-time feature segment associated with the site from the image data. The system further includes an analysis engine residing in the memory and executable by the processor. The analysis engine is operable to compare the real-time feature segment with a baseline feature segment and initiate recording of the image data if the feature segment comparison exceeds a predetermined criteria.

22 Claims, 3 Drawing Sheets

HOUGH TRANSFORM BASED MOTION DETECTION IMAGE RECORDING SYSTEM AND METHOD

This application claims priority under 35 USC §119(e)(1) of Provisional Application No. 60/254,813, filed Dec. 11, 2000.

TECHNICAL FIELD OF THE INVENTION

This invention relates in general to the field of image recording, and more particularly, to a Hough transform based motion detection image recording system and method.

BACKGROUND OF THE INVENTION

Surveillance equipment is oftentimes used to maintain the security of homes and businesses. For example, video cameras may be used to monitor a parking facility entrance and/or transaction location of an office or business. Images of the video camera may be recorded on video tape to provide a record of activity of the surveillance site. The video tapes containing the recorded images may be viewed by security personnel or stored for future use.

To reduce the quantity of video tape recorded images, motion detection and/or image recording systems are generally used to detect changes in the surveillance scene and record the surveillance scene if the changes exceed a predetermined criteria. For example, one system for motion detection and image recording includes generating digital image snapshots of a scene and determining pixel characteristics for each snapshot. The pixel characteristics are then compared from one image to the next image and, if the pixel characteristic differences exceed a predetermined criteria, the snapshot is digitally recorded.

Conventional motion detection and image recording systems, however, suffer several disadvantages. For example, pixel characteristic differences between comparative images may often result in the recording of insignificant scene variations. For example, pixel characteristics may exceed the predetermined pixel differential criteria as a result of lighting variations, such as variable cloud cover, shadows, wind induced motion, and precipitation. Thus, scene variations of little or no interest may be recorded, thereby utilizing limited storage capacity.

Additionally, to reduce the recording of images containing minor variations between image snapshots due to pixel differentiation techniques, conventional motion detection and image recording systems compare consecutive snapshot images to compensate for minor lighting and other pixel characteristic variations. However, comparing consecutive image snapshots also increases the quantity of images retained in memory.

SUMMARY OF THE INVENTION

Accordingly, a need has arisen for an improved motion detection and image recording system and method that provides increased control of the images recorded. The present invention provides a Hough transform based motion detection image recording system and method that addresses the shortcomings of prior motion detection and image recording systems and methods.

According to one embodiment of the present invention, a motion detection image recording system includes an image sensor operable to view a surveillance site an output real-time image data corresponding to the site. The system also includes a processor operable to receive the image data from the image sensor. The system also includes a memory coupled to the processor and a transformation application residing in the memory and executable by the processor. The transformation application is operable to detect a real-time feature segment associated with the site from the image data. The system further includes an analysis engine residing in the memory and executable by the processor. The analysis engine is operable to compare the real-time feature segment with a baseline feature segment and initiate recording of the image data if the feature segment comparison exceeds a predetermined criteria.

According to another embodiment of the present invention, a method for motion detection image recording includes generating a baseline feature segment associated with a surveillance site and receiving real-time image data corresponding to the surveillance site. The method also includes detecting a real-time feature segment associated with the surveillance site from the real-time image data and comparing the real-time feature segment with the baseline feature segment. The method further includes recording the real-time image data if the comparison of the real-time feature segment and the baseline feature segment exceeds a feature segment criteria.

According to another embodiment of the present invention, a method for motion detection image recording includes generating baseline feature segments corresponding to a surveillance site and receiving real-time image data corresponding to the surveillance site. The method also includes generating real-time feature segments associated with the surveillance site from the real-time image data and determining whether an occlusion is present in one or more of the real-time feature segments. The method further includes recording the real-time image data if the occlusion is present in one or more of the real-time feature segments.

The invention provides several technical advantages. For example, in one embodiment of the invention, a Hough based transformation application detects feature segments from image data corresponding to a scene. The system compares the detected feature segments with baseline feature segments to detect variations in the scene. For example, movement of a body or object within or into the scene will cause a corresponding occlusion in one or more of the feature segments, thereby indicating movement within the scene. If an occlusion of one or more feature segments is detected, the system automatically records the corresponding image data. Thus, the present invention provides greater control of the images recorded by substantially eliminating image recording due to lighting variations or other minor pixel characteristic differences within the scene.

Another technical advantage of the present invention includes greater image data processing efficiency. For example, conventional motion detection and image recording systems continuously store and compare consecutive image data snapshots to compensate for minor lighting and other pixel characteristic variations. The present invention, however, compares feature segments detected from real time image data to feature segments detected from baseline image data. Thus, the present invention substantially decreases the quantity of image data loaded and stored.

Another technical advantages will be readily apparent to one skilled in the art from the following figures, descriptions and claims.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

Figure 1:
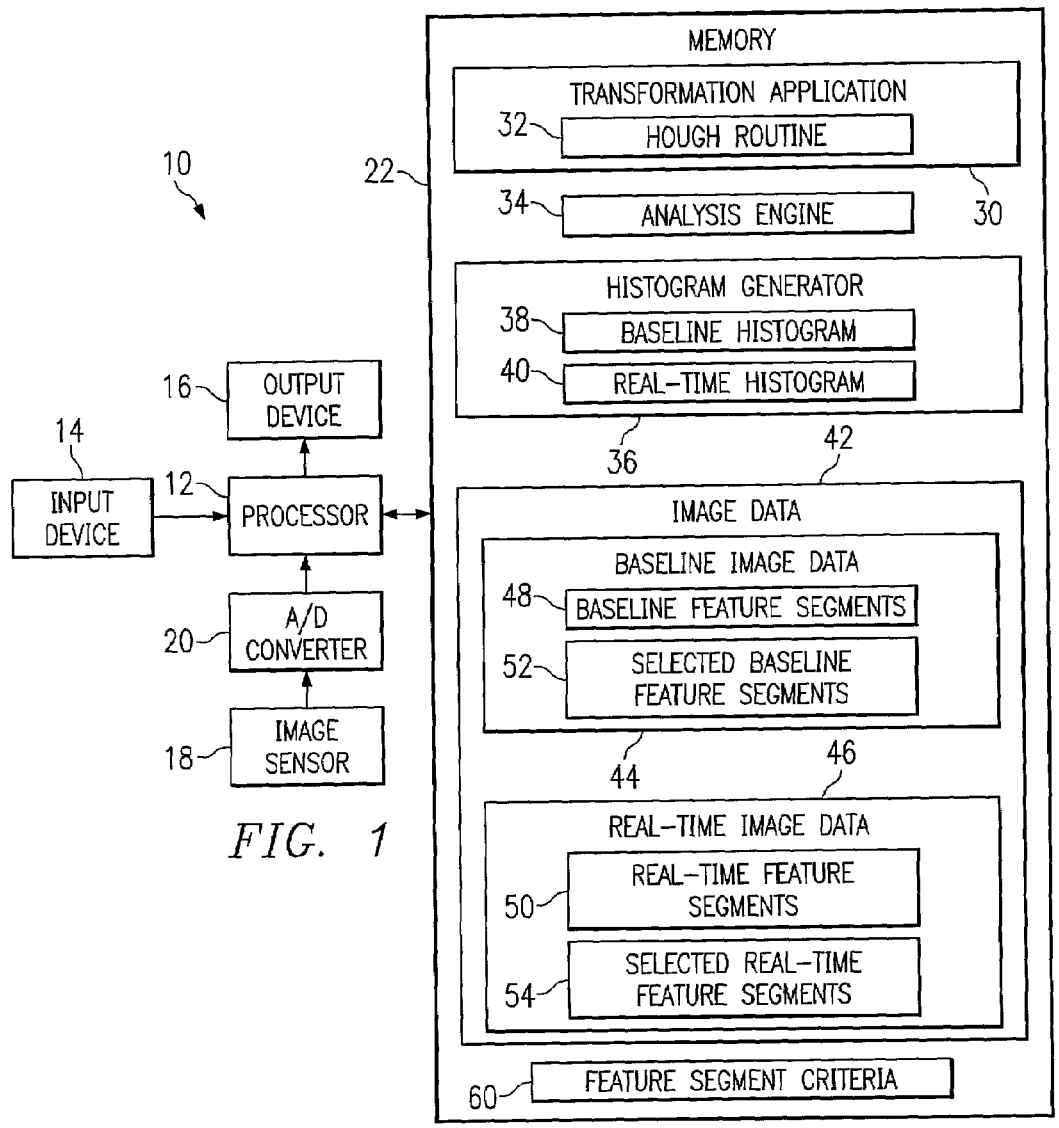
FIG. 1 is a block diagram illustrating a Hough transform based motion detection system in accordance with the embodiment of the present invention.

FIG. 1 is a block diagram illustrating a Hough transform base motion detection system 10 in accordance with an embodiment of the present invention. System 10 comprises a processor 12, an input device 14, an output device 16, an image sensor 18, an analog-to-digital (A/D) convector 20 and a memory 22. Processor 12 comprises a computer, work station, mini-computer, mainframe or other computing device. The present invention also encompasses computer software that may be stored in memory 22 and executed by processor 12. The computer software may also be stored in a variety of other types of storage media, including, but not limited to, floppy disk drives, hard drives, CD ROM disk drives or magnetic tape drives. The computer software may be identified generally as an application, routine, engine or other identifier. Data may be received from a user of system 10 using a keyboard or any other type of input device 14. Results may be output to a user of system 10 through output device 16, which may include a display, storage media or any other type of device.

System 10 includes a transformation application 30 which is a computer software program. In FIG. 1, transformation application 30 is illustrated as being stored in memory 22, where it can be executed by processor 12. Transformation application may also be stored on a variety of other types of storage media. Transformation application 30 includes a Hough routine 32 for detecting and extracting feature segments from image data corresponding to a scene or surveillance site received from image sensor 18. System 10 also includes an analysis engine 34, which is a computer software program. In FIG. 1, analysis engine 34 is illustrated as being stored in memory 22, where it can be executed by processor 12. Analysis engine 34 compares feature segments extracted from real-time image data with feature segments extracted from baseline image data to determine whether differences or variations between the real-time and baseline feature segments warrant recording of the real-time image data.

In the embodiment illustrated in FIG. 1, system 10 includes image sensor 18 and A/D convector 20 for providing digitized image data to processor 12. By way of example, image sensor 18 may include, but is not limited to, a camera, cam corder, or other image sensing device for providing analog image input data to A/D convector 20. A/D convector 20 receives the analog image data input from image sensor 18 and creates digitized image data for each frame or snapshot of the analog image data input. It will be understood that image sensor 18 may also provide image data directly to processor 12. For example, image sensor 18 may include, but is not limited to, a digital camera providing digital image data input directly to processor 12.

System 10 illustrated in FIG. 1 also includes a histogram generator 36, which is a computer software program. In FIG. 1, histogram generator resides in memory 22 where it can be executed by processor 12. Histogram generator 36 generates or plots a histogram corresponding to the image data feature segments based on Hough function values. Analysis engine 34 may then access the histograms generated by histogram generator 36 to compare real-time and baseline image data feature segments. For example, histogram generator 36 may generate a baseline histogram 38 corresponding to baseline image data feature segments and a real-time histogram 40 corresponding to real-time image data feature segments. However, other suitable methods or applications may be used to compare the real-time and baseline feature segment image data.

System 10 also includes image data 42 stored in memory 22. Image data 42 may include image information used by transformation application 30, analysis engine 34 and histogram generator 36 for detecting and comparing feature segments extracted from a scene or surveillance site. For example, image data 42 may include baseline image data 44 and real-time image data 46. Baseline image data 44 includes image information received by image sensor 18 corresponding to a scene or surveillance site for establishing a baseline measurement standard for feature segment comparisons. For example, baseline image data 44 includes baseline feature segments 48 extracted from the baseline image data 44 corresponding to the surveillance site substantially representing a period of inactivity within the surveillance site. Thus, baseline feature segments 48 may be used as a comparison standard for subsequent image information received from image sensor 18. Baseline feature segments 48 may be determined from baseline image data 44 collected over a predetermined period of time and may represent an average of feature segment values; however, other suitable methods may be used to establish the baseline feature segments 48.

Real-time image data 46 includes image information received by image sensor 18 corresponding to the surveillance site for comparison with the baseline image data 44. For example, real-time image data 46 includes real-time feature segments 50 extracted from the real-time image data 46 corresponding to the surveillance site. Real-time image data 46 and corresponding real-time feature segments 50 may represent consecutive image snapshots of the surveillance site or may represent periodic image snapshots of the surveillance site to accommodate a variety of image comparison sampling criteria. For example, real-time image data 46 and corresponding real-time feature segments 50 may be collected and extracted, respectively, according to a predetermined sampling rate corresponding to aspects or characteristics of the surveillance site. However, other suitable methods or considerations may be used to configure a sampling rate of the real-time image data 46 and feature segments 50.

Baseline image data 44 and real-time image data 46 may also include selected baseline feature segments 52 and selected real-time feature segments 54, respectively, for comparing a portion of the surveillance site. For example, only a portion of the surveillance site may be of surveillance interest or subject to detectable movement or motion. Thus, a portion or subset of the baseline feature segments 48 and real-time feature segments 50 may be used for comparison corresponding to the portion of the surveillance site of interest to determine whether image recording is warranted. Thus, a user of system 10 may select a portion or subset of the baseline feature segments 48 using input device 14 to be used for image comparison and store the subset as selected baseline feature segments 52. Additionally, analysis engine 34 may be configured to automatically identify a corresponding subset of the real-time feature segments 50 and store the subset as selected real-time feature segments 54. Thus, analysis engine 34 may be configured to compare all or a portion of the baseline image data 44 with all or a portion of the corresponding real-time image data 46 to determine whether image recording is warranted.

As described above, histogram generator 36 may be used to generate baseline histogram 38 and real-time histogram 40. Baseline histogram 38 may be generated from baseline feature segments 48 or selected baseline feature segments 52. Similarly, real-time histogram 40 may be generated from real-time feature segments 50 or selected real-time feature segments 54. Thus, depending on the analysis configuration desired by a user of system 10, analysis engine 34 may access and compare the baseline and real-time histograms 38 and 40, respectively, to determine whether to initiate image recording.

In the embodiment illustrated in FIG. 1, system 10 also includes feature segment criteria 60 stored in memory 22. Feature segment criteria 60 includes attributes., features, and/or values to be used in determining whether variations between the baseline image data 44 and the real-time image data 46 warrant image recording. For example, as will be described in greater detail below, the feature segments may include Hough function values such as feature segment length and angular orientation. Thus, feature segment criteria 60 may include occlusion ratios, length reduction ratios, or other suitable comparison factors for determining whether variations between the baseline and real-time image data 44 and 46 warrant recording of the real-time image data 46.

Figure 2:
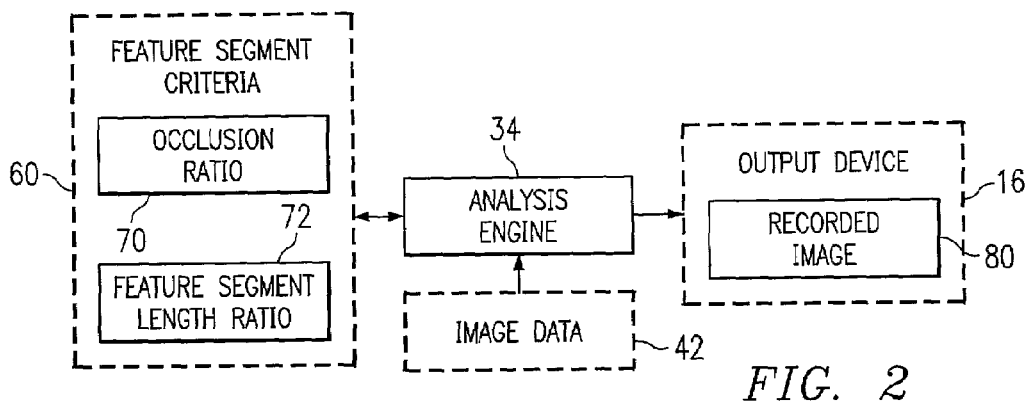
FIG. 2 is a block diagram illustrating a Hough transform based motion detection system in accordance with an embodiment of the present invention.

FIG. 2 is a block diagram illustrating system 10 in accordance with an embodiment of the present invention. In operation, a user of system 10 may have the option of selecting and/or inputting one or more feature segment criteria 60 for comparing baseline and real-time image data 44 and 46 received from image sensor 18. In the embodiment illustrated in FIG. 2, feature segment criteria 60 includes an occlusion ratio 70 and feature segment length ratio 72; however other suitable comparison values or methods may be used to compare the baseline and real-time image data 44 and 46.

For example, transformation application 30 extracts feature segments from baseline and real time image data 44 and 46 received from image sensor 18. The feature segments extracted using transformation application 30 may include line segments, curve segments, or other geometric feature segments extracted from the image of the surveillance site corresponding to edges of features within the surveillance site. Transformation application 30 identifies the detected feature segments by segment length and angular orientation or direction relative to a predetermined reference frame. Histogram generator 36 may be used to plot each feature segment as a function of feature segment length and corresponding angular orientation.

Occlusion ratio 70 of feature segment criteria 60 may include a ratio or percentage of a particular feature segment occluded by an object passing between the image sensor 18 and the corresponding feature of the surveillance site. Thus, as an object enters the surveillance site, all or a portion of one or more real-time feature segments 50 become occluded. A value for the occlusion ratio 70 may be selected such that if a predetermined percentage of a baseline feature segment 48 becomes occluded, analysis engine 34 automatically initiates recording of the real-time image data 46. For example, a value of ten percent may be assigned as the occlusion ratio 70 such that if the occluded portion of the real-time feature segment 50 exceeds ten percent of the corresponding baseline feature segment 48, analysis engine initiates recording of the real-time image data 46. Alternatively, for example, the occlusion ratio 70 may also be selected such that any occlusion of a real-time feature segment 50 initiates recording of the real-time image data 46. However, other suitable occlusion ratio 70 values may also be used.

Feature segment length ratio 72 of feature segment criteria 60 may include a ratio or percentage of a length of a detected feature segment for determining whether a reduction or increase of the length of a particular feature segment warrants recording of the real-time image data 46. For example, as described above, Hough function values for feature segments include a length and angular orientation of the feature segment relative to a predetermined reference frame. The length of each baseline feature segment 48 is determined by transformation application 30 and used for determining whether the corresponding real-time feature segment 50 experiences a reduction or increase in length by a predetermined amount. Thus, as an object enters the surveillance site, or as an object within the surveillance site experiences movement, such as an opening or closing door, all or a portion of one or more real-time feature segments 50 become occluded or changes in length, respectively, thereby causing a corresponding reduction or increase in the length of the real-time feature segments 50. A predetermined value may be assigned to the feature segment length ratio 72 such that if the reduction or increase in length of the real-time feature segment 50 exceeds the predetermined value, analysis engine initiates recording of the real-time image data 46.

Analysis engine 34 may also be configured such that any additional real-time feature segments 50 detected by transformation application 30 exceeding the baseline feature segments 48 initiates recording of the real-time image data 46. For example, as an object enters the surveillance site, application transformation 30 may detect additional feature segments corresponding to the object that are not represented by the baseline feature segments 48. The analysis engine 34 may be configured such that the additional real-time feature segments 50 corresponding to the object initiate recording of the real-time image data 46. Therefore, if a quantity of real-time feature segments 50 exceeds a quantity of the baseline feature segments 48, analysis engine 34 may be configured to initiate recording of the real-time image data 46. Thus, the present invention provides for a variety of comparison techniques and methodologies related to feature segment detection and comparison.

If variations between the real-time and baseline image data 46 and 44 exceed feature segment criteria 60, analysis engine 34 initiates recording of the real-time image data 46. Output of analysis engine 34 is identified in FIG. 2 as recorded image 80. Recorded image 80 may be displayed or stored in a variety of storage media. Additionally, recorded image 80 may be stored in a compressed format, thereby reducing an amount of storage space required for recorded images 80.

Figure 3A:
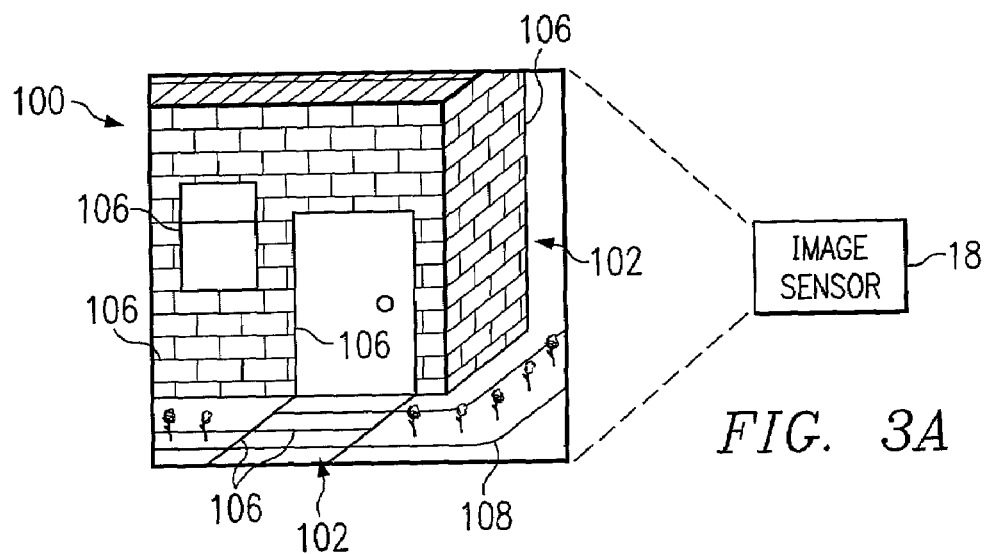
FIGS. 3A–3C are diagrams illustrating a scene, a display of detected feature segments from the scene, and a histogram of the detected feature segments in accordance with the embodiment of the present invention.
Figure 3B:
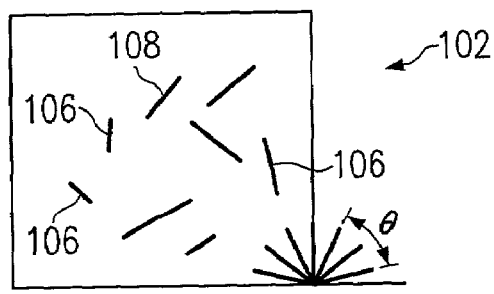
Figure 3C:
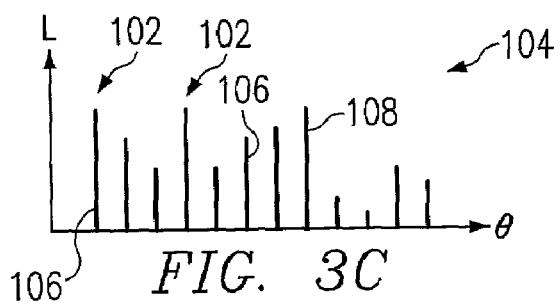

FIGS. 3A–3C are diagrams illustrating a surveillance site 100, detected feature segments 102 corresponding to site 100, and a histogram 104 representing the detected feature segments 102, respectively. Referring to FIG. 3A, image sensor 18 is used to view site 100 and transmit image data 42 to processor 12. Site 100 may include any type of surveillance area. The objects within the surveillance site 100 may include straight-line 106 and/or circular arc or curved edges 108, which may be extracted by transformation application 30 and plotted by histogram generator 36 as a function of feature segment 102 length and angular orientation relative to a predetermined reference frame as illustrated in FIG. 3B. The detected feature segments 102 may then be plotted as histogram 104. For example, each feature segment 102 corresponding to a straight-line or curved edge 106 and 108 may be plotted as a function of length and angular orientation.

In operation, image sensor 18 collects and transfers image data 42 to processor 12. Transformation application 30 receives baseline image data 44 and extracts baseline feature segments 48 corresponding to the straight-line and curved edges 106 and 108 contained within the surveillance site 100. A user of system 10 may also identify and store selected baseline feature segments 52 to be used for comparison to determine whether image recording is initiated. Histogram generator 36 generates baseline histogram 38 using baseline image data 44 such that baseline feature segments 48 or selected baseline feature segments 52 are plotted as a function of length and angular orientation, as illustrated in FIG. 3C.

Image sensor 18 also collects and transmits real-time image data 46 to processor 12. Application transformation 30 receives the real-time image data 46 and extracts real-time feature segments 50 corresponding to the surveillance site 100. If a user of system 10 identified and stored selected baseline feature segments 52, analysis engine identifies and stores corresponding selected real-time feature segments 54 for comparison with the selected baseline feature segments 52. Additionally, histogram generator 36 generates real-time histogram 40 using real-time real-time image data 46 such that real-time feature segments 50 or selected real-time feature segments 54 are plotted as a function of length and angular orientation, as illustrated in FIG. 3C.

Analysis engine 34 compares baseline image data 44, such as baseline feature segments 48, selected baseline feature segments 52 or baseline histogram 38, with real-time image data 46, such as real-time feature segments 50, selected real-time feature segments 54 or real-time histogram 40, respectively, to determine whether recording of the real-time image data 46 is warranted. Analysis engine 34 accesses feature segment criteria 60 to determine whether variations between the baseline image data 44 and the real-time image data 46 exceed the feature segment criteria 60, thereby warranting recording of the real-time image data 46. If the feature segment criteria 60 is not met or exceeded for a particular image frame or snapshot, the real-time image data 46 is not recorded and a next image frame or snapshot of real-time image data 46 is evaluated.

Figure 4:
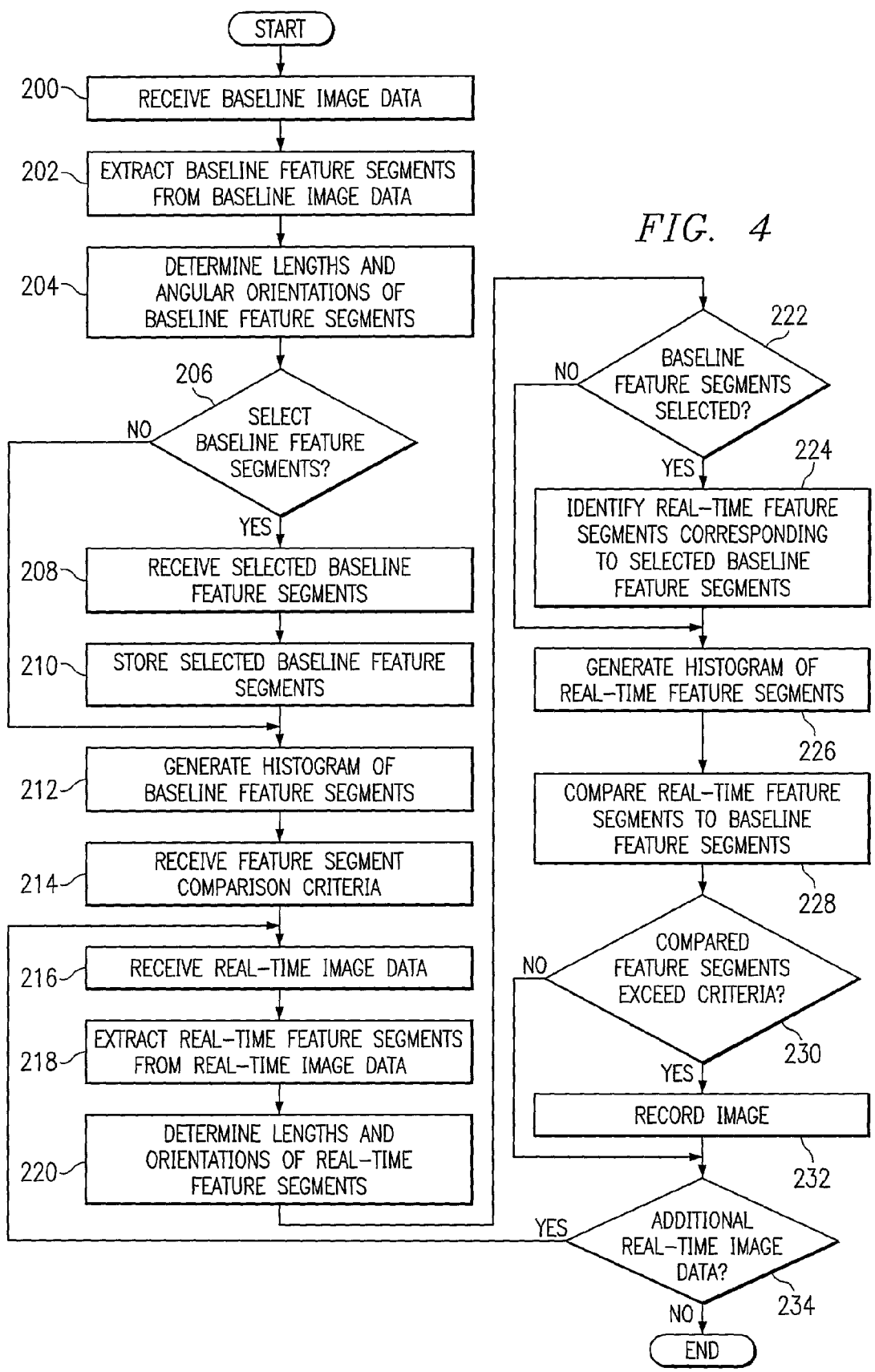
FIG. 4 is a flowchart illustrating a method for Hough transformed based motion detection in accordance with the embodiment of the present invention.

FIG. 4 is a flowchart of a method for Hough based motion detection in accordance with an embodiment of the present invention. The method begins at step 200 where baseline image data 44 is received from image sensor 18. At step 202, transformation application 30 extracts baseline feature segments 48 associated with surveillance site 100 using baseline image data 44. At step 204, Hough routine 32 determines lengths and angular orientations of the baseline feature segments 48 associated with the surveillance site 100 using baseline image data 44.

At decisional step 206, a determination is made whether a portion or subset of the baseline feature segments 48 will be used for comparison to determine whether the real-time image data 46 will be recorded. For example, as described above, a portion of site 100 may be of particular interest or susceptible to detectable movement or motion. Thus, a user of system 10 may select one or more of the baseline feature segments 48 to be used as the selected baseline feature segments 52 for comparing with the real-time image data 46.

If a portion or subset of the baseline feature segments 48 is desired, the method proceeds to step 208, where the selected baseline feature segments 52 are identified by the user. At step 214, the selected baseline feature segments 52 are stored in memory 22. If all of the baseline feature segments 48 are desired for comparison with the real-time image data 46, the method proceeds from step 206 to step 212.

At step 212, histogram generator 36 generates baseline histogram 38 for the baseline image data 44. Histogram generator 36 may generate baseline histogram 38 based on baseline feature segments 48 or selected baseline feature segments 52 as a function of the length and angular orientation of each feature segment relative to a predetermined reference frame.

At step 214, feature segment criteria 60 is received from a user of system 10. As described above, feature segment criteria 60 may include an occlusion ratio 70, feature segment length ratio 72, or other types of comparison factors to evaluate the variations between the baseline image data 44 and the real-time image data 46.

At step 216, real-time image data 46 is received from image sensor 18. At step 218, transformation application 30 extracts real-time feature segments 50 corresponding to the surveillance site 100. At step 220, Hough routine 32 determines the length and angular orientation of each of the real-time feature segments 50. At decisional step 222, a determination is made whether selected baseline feature segments 52 were identified and stored by a user of system 10. If selected baseline feature segments 52 have been identified and stored by a user of system 10, the method proceeds to step 224, where analysis engine 34 identifies selected real-time feature segments 54 corresponding to the selected baseline feature segments 52 for comparison with the selected baseline feature segments 52. If selected baseline feature segments 52 were not identified and stored by a user of system 10, the method proceeds from step 222 to step 226.

At step 226, histogram generator 36 generates real-time histogram 40 for the real-time image data 46. Histogram generator 36 may generate real-time histogram 40 based on real-time feature segments 50 or selected real-time feature segments 54 as a function of the length and angular orientation of each real-time feature segment relative to a predetermined reference frame.

At step 228, analysis engine 34 compares the baseline image data 44 with the real-time image data 46 and determines whether the feature segment criteria 60 warrants recording of the real-time image data 46. For example, analysis engine 34 may evaluate baseline and real-time histograms 38 and 40 to determine whether the variations between the real-time feature segments 50 or 54 and the baseline feature segments 48 and 52, respectively, warrant recording of the real-time image data 46.

At decisional step 230, a determination is made whether the comparison of the baseline and real-time image data 44 and 46 exceed the feature segment criteria 60. If the comparison exceeds the feature segment criteria 60, the method proceeds to step 232, where the real-time image data 46 corresponding to the surveillance site 100 is recorded. If the comparison does not exceed the feature segment criteria 60, the method proceeds from step 230 to step 234, where a determination is made whether additional real-time image data 46 from sensor 18 requires evaluation. If additional real-time image data 46 is received from image sensor 18, the method returns to step 216. If no additional real-time image data 46 requires evaluation, the method terminates.

Thus, the present invention detects movement or motion within a surveillance site 100 by using a Hough routine 32 to detect and extract straight-line and curve segments representing edges of features within the surveillance site 100. If an object enters the surveillance site 100 or features within the surveillance site 100 experience movement, the detected feature segments experience a change in length, angular orientation, or other alteration, and/or additional feature segments may appear within the surveillance site 100. An analysis engine compares baseline feature segments 48 to real-time feature segments 50 to determine whether the variations between the feature segments indicates motion within the surveillance site 100. Thus, recording of images due to lighting variations or other pixel characteristic differences is substantially eliminated. Additionally, the present invention requires substantially less data loading than conventional motion detection and image recording systems because real-time image data 46 is compared to baseline image data 44 rather than continuously comparing consecutive image snapshots.

Although the present invention has been described in detail, it should be understood that various changes, substitutions, and alterations can be made hereto without departing from the spirit and scope of the invention as defined by the appended claims.

What is claimed is:

1. A method for motion detection image recording, comprising:
   generating a baseline feature segment associated with a surveillance site;
   generating a baseline histogram associated with the baseline feature segment;
   receiving real-time image data corresponding to the surveillance site;
   detecting a real-time feature segment associated with the surveillance site from the real-time image data;
   generating a real-time histogram associated with the real-time feature segment;
   comparing the real-time feature segment with the baseline feature segment by comparing the baseline histogram to the real-time histogram; and
   recording the real-time image data if the comparison of the real-time feature segment with the baseline feature segment exceeds a feature segment criteria.

2. The method of claim 1, wherein detecting a real-time feature segment further comprises transforming the real-time image data using a Hough routine to extract the real-time feature segment from the real-time image data.

3. The method of claim 1, wherein generating a baseline feature segment further comprises:
   receiving baseline image data corresponding to the surveillance site;
   detecting a plurality of feature segments corresponding to the surveillance site from the baseline image data; and
   identifying one of the plurality of feature segments as the baseline feature segment.

4. The method of claim 1, wherein comparing the real-time feature segment further comprises determining whether an occlusion is present in the real-time feature segment relative to the baseline feature segment, and wherein recording the real-time image data comprises recording the real-time image data if the occlusion exceeds the feature segment criteria.

5. The method of claim 1, wherein receiving real-time image data comprises:
   generating analog image data via an analog camera;
   converting the analog image data to digital image data; and
   transmitting the digital image data to a processor to detect the real-time feature segment.

6. The method of claim 1, wherein generating a baseline feature segment further comprises:
   receiving baseline image data corresponding to the surveillance site;
   detecting a plurality of feature segments associated with the surveillance site from the baseline image data; and
   identifying a subset of the plurality of feature segments as the baseline feature segment.

7. The method of claim 1, wherein comparing the real-time feature segment to the baseline feature segment further comprises:
   determining a length of the baseline feature segment;
   determining a length of the corresponding real-time feature segment; and
   determining whether a difference between the length of the baseline feature segment and the length of the real-time feature segment exceeds the feature segment criteria.

8. A method for image recording, comprising:
   generating baseline feature segments corresponding to a surveillance site;
   generating a baseline histogram corresponding to the baseline feature segments;
   receiving real-time image data corresponding to the surveillance site;
   generating real-time feature segments associated with the surveillance site from the real-time image data;
   generating a real-time histogram corresponding to the real-time feature segments;
   determining whether an occlusion is present in one or more of the real-time feature segments by comparing the baseline histogram with the real-time histogram; and
   recording the real-time image data if the occlusion is present in one or more of the real-time feature segments.

9. The method of claim 8, further comprising: receiving feature segment criteria;
   determining whether the occlusion exceeds the feature segment criteria; and
   wherein recording comprises recording the real-time image data if the occlusion exceeds the feature segment criteria.

10. The method of claim 8, wherein detecting the real-time feature segments further comprises applying a Hough routine to the real-time image data to extract the real-time feature segments from the real-time image data.

11. The method of claim 8, further comprising recording the real-time image data if a quantity of the real-time feature segments exceeds a quantity of the baseline feature segments.

12. A method for motion detection image recording, comprising:
   generating a baseline feature segment associated with a surveillance site;
   determining a length of the baseline feature segment;

receiving real-time image data corresponding to the surveillance site;

detecting a real-time feature segment associated with the surveillance site from the real-time image data;

determining a length of the corresponding real-time feature segment;

comparing the real-time feature segment with the baseline feature segment by determining whether a difference between the length of the baseline feature segment and the length of the real-time feature segment exceeds a feature segment criteria; and recording the real-time image data if the comparison of the real-time feature segment with the baseline feature segment exceeds a feature segment criteria.

13. The method of claim 12, wherein detecting a real-time feature segment further comprises transforming the real-time image data using a Hough routine to extract the real-time feature segment from the real-time image data.

14. The method of claim 12, wherein generating a baseline feature segment further comprises:

receiving baseline image data corresponding to the surveillance site;

detecting a plurality of feature segments corresponding to the surveillance site from the baseline image data; and identifying one of the plurality of feature segments as the baseline feature segment.

15. The method of claim 12, wherein comparing the real-time feature segment further comprises determining whether an occlusion is present in the real-time feature segment relative to the baseline feature segment, and wherein recording the real-time image data comprises recording the real-time image data if the occlusion exceeds the feature segment criteria.

16. The method of claim 12, wherein receiving real-time image data comprises:

generating analog image data via an analog camera;

converting the analog image data to digital image data; and transmitting the digital image data to a processor to detect the real-time feature segment.

17. The method of claim 12, wherein generating a baseline feature segment further comprises:

receiving baseline image data corresponding to the surveillance site;

detecting a plurality of feature segments associated with the surveillance site from the baseline image data; and identifying a subset of the plurality of feature segments as the baseline feature segment.

18. The method of claim 12, wherein comparing the real-time feature segment with the baseline feature segment further comprises:

generating a baseline histogram associated with the baseline feature segment;

generating a real-time histogram associated with the real-time feature segment; and comparing the baseline histogram to the real-time histogram.

19. A method for image recording, comprising:

generating baseline feature segments corresponding to a surveillance site;

receiving real-time image data corresponding to the surveillance site;

generating real-time feature segments associated with the surveillance site from the real-time image data;

determining whether an occlusion is present in one or more of the real-time feature segments; and in one or more of the real-time feature segments and a quantity of the real-time feature segments exceeds a quantity of the baseline feature segments.

20. The method of claim 19, further comprising:

receiving feature segment criteria;

determining whether the occlusion exceeds the feature segment criteria; and wherein recording comprises recording the real-time image data if the occlusion exceeds the feature segment criteria.

21. The method of claim 19, wherein detecting the real-time feature segments further comprises applying a Hough routine to the real-time image data to extract the real-time feature segments from the real-time image data.

22. The method of claim 19, further comprising:

generating a baseline histogram corresponding to the baseline feature segments;

generating a real-time histogram corresponding to the real-time feature segments; and said step of determining whether an occlusion is present in one or more of the real-time feature segments includes comparing the baseline histogram with the real-time histogram.

* * * * *